Patented Sept. 14, 1926.

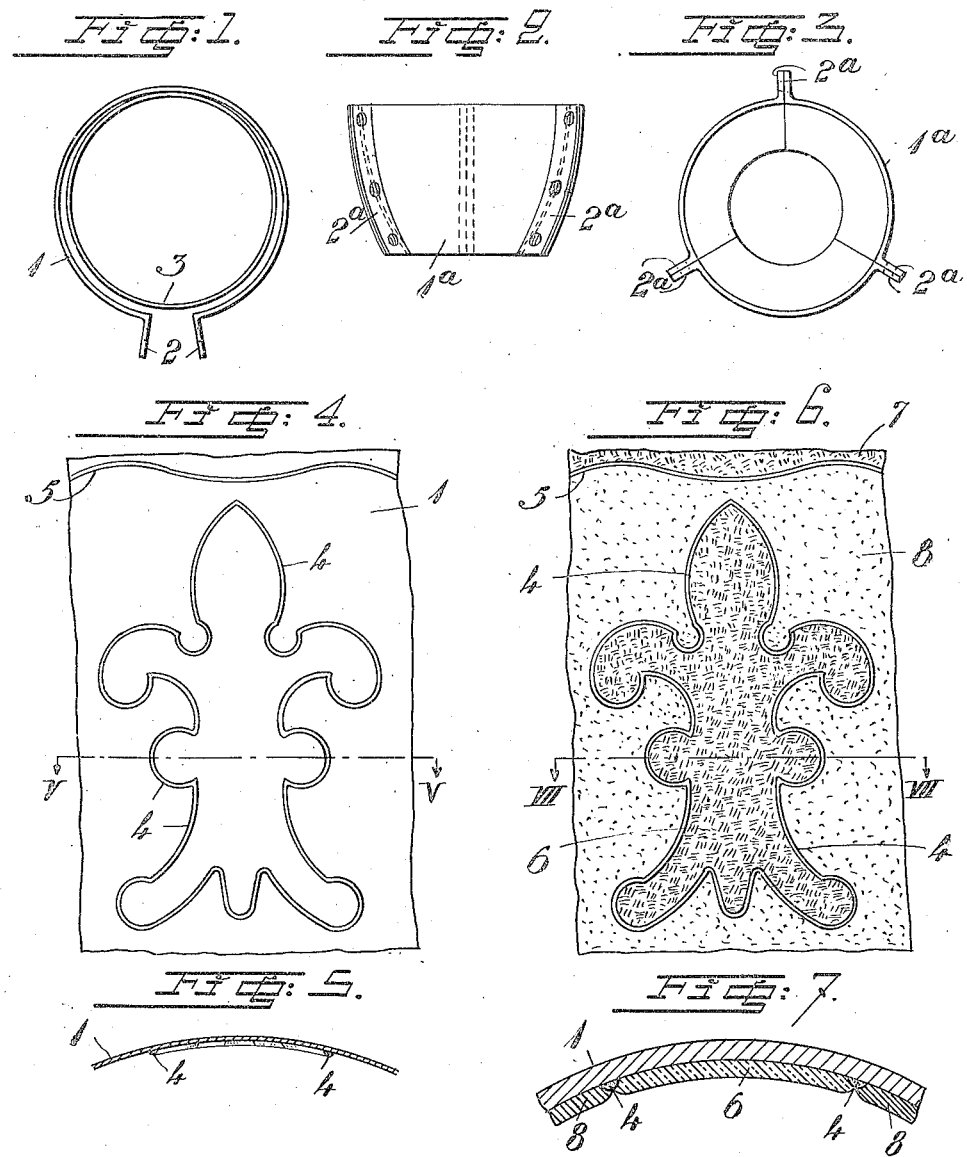

1,599,939

UNITED STATES PATENT OFFICE.

IVAR JOHAN EDVARD ÅGREN AND GUNNAR ROSENQVIST, OF UPPSALA, SWEDEN.

METHOD OF PRODUCING OBJECTS WITH DESIRED OUTLINE AND SURFACE.

Application filed May 21, 1925, Serial No. 31,958, and in Sweden January 31, 1921.

This invention relates to a method of producing objects having desired outline and surface by means of galvanoplastic precipitation of the metal from which the article is to be made by galvanoplastic precipitation in separable, permanent metal molds.

A further object of the invention is to deposit a galvanoplastic precipitation of the metal from which the desired article is to be made in a separable annular metal mold formed of springy material, whereby after the article is formed the mold can readily be opened or taken apart thereby to permit the easy removal of the completed article therefrom without injury to the mold.

A further object of the invention is to provide a process by means of which designs or openings having any desired form of edges may be produced on the article during the precipitation on the wall of the mold.

With the foregoing and other objects in view, the invention consists in the novel procedure hereinafter more fully described and particularly pointed out in the claims.

In the drawings acompanying and forming part of this specification—

Fig. 1 is a plan view of a preferred form of annular metal mold containing an article that has been formed therein in accordance with the present invention;

Figs. 2 and 3 are respectively a side elevation and a top plan view of a modified form of mold;

Fig. 4 is a fragmentary view illustrating a development of a portion of the inner surface of a mold used in carrying out the process;

Fig. 6 is a tranverse sectional view taken approximately on the line V—V of Fig. 4; and Figs. 6 and 7 are views similar to Figs. 4 and 5 respectively, but showing the surface of the mold after the precipitation has taken place, Fig. 7 being on a somewhat larger scale.

The mold 1 shown in Fig. 1 is preferably formed of resilient material and is slit longitudinally and provided with a pair of flanges 2 perforated for the reception of fastening bolts (not shown) or other means for securing the flanges 2 together thereby to close the mold. With the mold in closed position, that is to say, with the flanges 2 drawn together and retained in contiguous relation, the metal from which the article is to be produced is deposited on the inner surface of the mold by galvanoplastic precipitation, resulting in the production of an article 3, the exterior form of which will of course correspond to the inner surface of the mold. When the article is to be removed from the mold, the fastening means is released, whereupon the flanges 2 will spread apart as shown in Fig. 1, thus leaving the article free to be lifted out of the mold.

The mold 1ª shown in Figs. 2 and 3, instead of being formed of one piece, comprises three sections, each provided with a pair of flanges 2ª, the flanges of each section being secured to the flanges of the adjacent sections, thus forming a complete mold. The mold in this form may be made either of rigid or resilient material, as desired, it being understood, of course, that if made of resilient material, when the fastening means is released, the resiliency of the mold will make it easier to remove the article therefrom.

In Figs. 4 to 7 is illustrated the manner in which the article may have formed thereon any suitable design or an opening having any desired form of edge. For this purpose, narrow strips of insulating material 4 and 5 are attached to the inner surface of the mold prior to precipitation, these strips being so placed as to form the outline of the design or opening which it is desired to form in the exterior surface of the completed article. Figs. 6 and 7 show the surface of the mold after the precipitation has been accomplished, and it will be noted that these strips form weakened portions in the precipitated metal, whereby the metal included between these strips may be removed. For example, the precipitation 6 included within the design outlined by the strip 4 can readily be removed, whereby an opening is formed in the article, which opening is bounded by an edge of the required configuration. In like manner, by the removal of the precipitation 7 the article may be provided with a suitable decorative edge. The precipitation 8 indicates the body of the completed article after the precipitations 6 and 7 have been removed.

It will be understood, of course, that the mold itself may be produced in any desired manner, such for instance as by galvanoplastic precipitation.

The expression "permanent" as used in the specification and claims in describing the model, is intended to mean a mold which can be used repeatedly any number of times, as distinguished from a mold which must be destroyed in order to remove the article therefrom.

Having thus described our invention, what we claim is:

1. A method of producing hollow articles with desired outline and surface, which consists in making galvanoplastic precipitations in a separable, permanent, metal mold.

2. A method of producing articles with desired outline and surface, which consists in making galvanoplastic precipitations in an annular resilient metal mold, said mold being slit longitudinally.

3. A method of producing objects with desired outline and surface, which consists in attaching narrow strips of insulating material to the surface of a metal mold, said strips being so disposed as to form a required design, and making galvanoplastic precipitations on said surface.

4. A method of producing objects with desired outline and surface, which consists in forming metal molds of elastic material and slitting said molds longitudinally, attaching to the surface of said molds narrow strips of insulating material disposed so as to form a required design, and making galvanoplastic precipitations on said surface.

In testimony whereof we have signed our names to this specification.

IVAR JOHAN EDVARD AGREN.
GUNNAR ROSENQVIST.